L. O. THOMAS.
ASSEMBLING MACHINE.
APPLICATION FILED NOV. 8, 1917.

1,392,858.

Patented Oct. 4, 1921.
2 SHEETS—SHEET 1.

Inventor:
Lester O. Thomas,
by Emery, Booth, Janney & Varney
Attys.

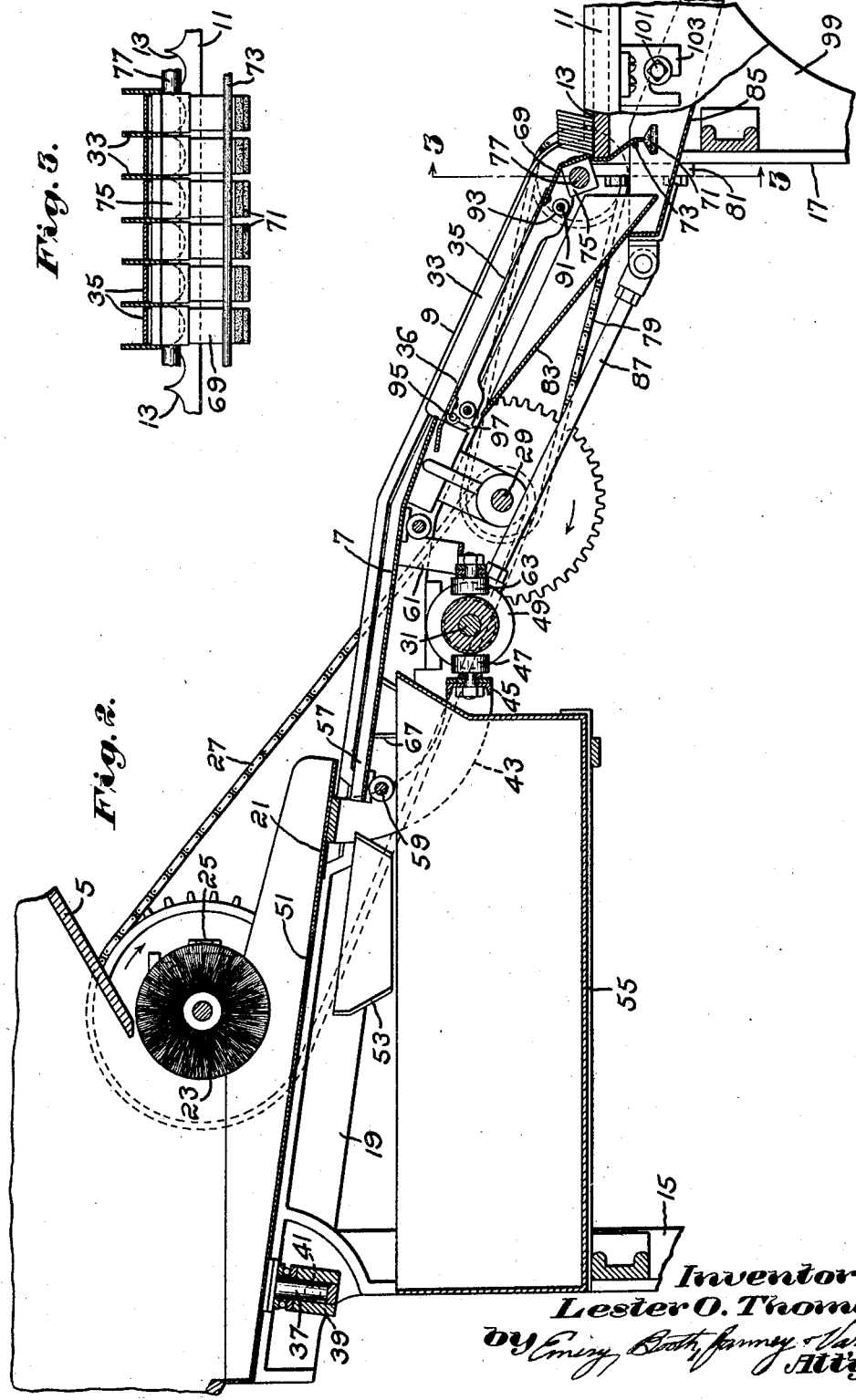

UNITED STATES PATENT OFFICE.

LESTER O. THOMAS, OF BOSTON, MASSACHUSETTS, ASSIGNOR TO NEW ENGLAND CONFECTIONERY COMPANY, OF BOSTON, MASSACHUSETTS, A CORPORATION OF MASSACHUSETTS.

ASSEMBLING-MACHINE.

1,392,858.     Specification of Letters Patent.     Patented Oct. 4, 1921.

Application filed November 3, 1917. Serial No. 200,999.

*To all whom it may concern:*

Be it known that I, LESTER O. THOMAS, a citizen of the United States, and resident of Boston, in the county of Suffolk and Commonwealth of Massachusetts, have invented an Improvement in Assembling-Machines, of which the following description, in connection with the accompanying drawings, is a specification, like characters on the drawings representing like parts.

This invention relates to assembling machines and in particular to machines designed to assemble thin disk-like articles in stacked-up relation. An example of such articles is the wafers of candy which usually are sold in packages in the form of a stack or roll. For convenience in the following description I shall refer specifically to the articles assembled as wafers, using the word in an exemplary sense.

My invention will best be understood by reference to the following description taken in connection with the accompanying drawings wherein:

Fig. 2 is a section on the line 2—2 of Fig. 1; and

Fig. 3 is a section on the line 3—3 of Fig. 2.

Figure 1:
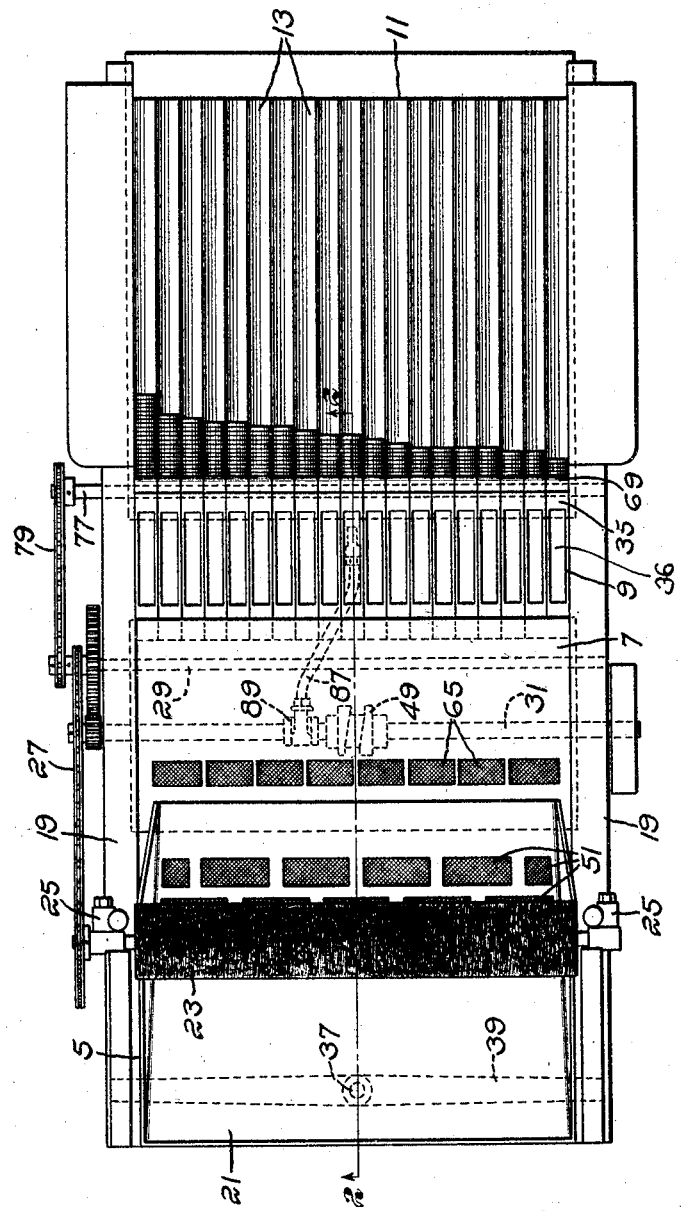
Figure 1 is a plan view of a machine embodying my invention, a portion of the feeding hopper being removed.

Referring to the drawings, the operation of the disclosed machine may be outlined briefly as follows: The wafers are dumped into a hopper 5 from which they are delivered over a sorting mechanism embodying inclined ways 7 and 9 which sort them out into alinement and deliver them one by one in stacked-up relation to a receiving table 11 having channels or grooves 13 to receive the various stacks of wafers in the manner illustrated in Figs. 2 and 1. In the embodiment of the invention disclosed the wafers are round and the channels 13 are curved grooves.

Herein the receiving hopper and the sorting mechanism are mounted on a suitable frame embodying the rear and front uprights 15 and 17 respectively connected by side bars 19. The hopper 5 is mounted at the rear of the frame preferably in a manner hereafter to be more fully described. This hopper may be in two parts as shown in Fig. 2, the lower part 21 forming an inclined delivery trough or spout from which the wafers may be delivered to the incline 7. To partially assort the wafers they are delivered to the incline 7 in such manner that ordinarily but one thickness or layer is upon the same, and to effect this the discharge opening through which they pass from the interior of the hopper 5 along the inclined bottom 21 thereof is restricted to prevent a bulk of wafers from passing therethrough at one time. For this purpose I may utilize a brush 23 which partially closes the delivery opening of the hopper. This brush is rotatable and may be conveniently mounted in adjustable boxes 25 and is driven in a clockwise direction by chain 27 which takes motion from the shaft 29 geared to the main drive shaft 31 in the manner clearly shown in Fig. 1. The brush in revolving sweeps back, as it were, the upper wafers of the mass which is gravitating toward the discharge opening of the hopper and permits only the lower ones to escape, so that they slide forwardly over the inclined bottom 21 in a thin layer spread out substantially without any overlapping or piled-up wafers.

The wafers are delivered from the incline 7 to the incline 9 and by the coöperation of these mechanisms the layer of wafers in which the single elements are in disorder is brought into a ranked order so that wafers are delivered in rows to the various grooves 13 of the delivery table 11. For the present I shall disregard the detailed construction of the part 9 and state simply that it is composed of a number of individual passageways or chutes, each about the breadth of a single wafer, embodying side partitions 33 and bottoms 35. As the wafers pass over the incline 7 they are delivered to the upper ends of the passageways formed by the partitions 33 and the wafers are thus sorted out into a series of parallel rows.

Having thus described in a general way the assorting mechanism, I will now describe the same somewhat more in detail, taking up the mechanical details illustrated and describing some of the devices which facilitate the assorting operation. As herein shown, the hopper 5 as a whole is supported at its rear end on a pivot 37 entering a bearing in a transverse bar 39 adjustably supported on trunnion screws 41 in the side bars 19 of the frame. By these means the angle of the inclined bottom 21 relative to the surface 7 which receives the wafers therefrom can be readily varied. To facilitate discharge of the wafers from the hopper to the surface 7, the hopper is preferably slightly vibrated about the pivot 37, and for this purpose brackets 43 are secured to the forward end thereof and connected by a crossbar 45 having secured thereto a cam roll 47 adapted to engage with the groove of a cam 49 mounted on the main drive shaft 31. From reference to Fig. 1 it will be abundantly clear that as the drive shaft rotates the hopper 5 will be vibrated about its pivot 37. Preferably there is provided in the bottom 21 of the hopper screens 51 which will permit dust and small fragments to be eliminated from the mass of wafers. These screens may be placed, as shown in Fig. 2, adjacent the brush 23, as that will tend to separate the dust and crums. Such dust passes through the screens 51 and is discharged through chute 53 into a removable waste box 55.

The inclined surface 7 is also given a vibratory movement in order to separate any wafers which may by chance have been delivered thereto in overlapping relation and to facilitate the entering of the wafers between the partitions 33 of the mechanism 9. It will be understood that the wafers in their descent may strike against the ends of these partitions and if a transverse movement is imparted to the surface 7, they will be, as it were, rolled over the ends of the partitions into the passageways between them. In the present embodiment of the invention the supporting surface 7 is mounted on brackets 57 which are adapted to slide on rods 59 extending transversely between the side bars 19 of the frame. Also attached to the member 7 is a bracket 61 carrying cam roll 63 which coöperates with the groove of cam 49 already referred to. When the machine is in operation, therefore, the member 7 on its supporting brackets 57 vibrates transversely along the rods 59.

To further separate dust and small pieces from the wafers, the member 7 may be provided with screened openings 65 discharging through spout 67 to the waste box 55.

I shall next describe the manner in which the wafers which pass one after the other down one of the chutes or passages between the partitions 33 are delivered in stacked-up relation to the corresponding groove 13 in the receiving table, and in doing so shall refer particularly to Figs. 2 and 3. In the embodiment of the invention here shown, as seen in Fig. 2, the bottom 35 of the chute does not extend into contact with the end of the receiving table but a supporting surface is provided which herein takes the form of a flexible strip 69 extending between the ends of the bottom 35 of the chute and yieldably extended across the inner end of the groove 13, conveniently as herein shown by means of the weight 71 which stretches the same over the crossbar 73 and thus holds the strip extended across the end of the groove. Beneath the strip and supporting the same is a roller 75 which may conveniently be square in section, as shown. There is, as appears in Fig. 3, one of these rollers for each strip, or in other words, one for each passageway or chute of the mechanism 9 and one for each receiving groove. The rollers 75 may be mounted on a common shaft 77 driven by a chain 79 from shaft 29, as clearly appears from Fig. 1. The function and method of operation of these rollers will more fully appear hereafter. For the time being it is only necessary to point out that these rollers support the flexible strip and hold it across the end of the groove 13, so that the strip in coöperation with the bottom 35 of the delivery chute will guide each wafer downwardly, so that it will fall edgewise into the channel 13.

The rollers have a further function of feeding forward the assembled wafers in the groove to permit new ones to be added at the inner end of the pile as fast as they come down the delivery chute. The rollers thus constitute a stacking mechanism. Referring to Fig. 2, and imagining the rollers 75 to be rotating in a clockwise direction, it will be seen that when the side of the square is forward the flexible strip 69 extending across the end of the groove will be relaxed and a wafer is permitted to slide down and fall into the end of the groove. The rotation continuing, the corner of the roller, which is simply an example of a marked, cam-like rise, distends the strip, drawing the same up against the yielding resistance provided by the weight 71 and pushes along the assembled stack of wafers in the groove 13. This provides a slight clearance between the end of the stack and the end of the groove and as the side of the roller again assumes an upright position, space is provided to permit another wafer to drop into place at the end of the pile. At the same time the strip 7 provides a continuous supporting surface for the wafers and holds them out of contact with any mechanism in which they would be likely to catch or which would be likely to break the same. Furthermore, the action of the rollers, which are in fact cams acting upon the wafers, is such that they give the pile a steady push instead of a sharp blow and breakage is thus minimized. The shaft 77 carrying the rollers 75 is conveniently mounted on brackets 81 (Fig. 2) vertically adjustable on the uprights 17 to permit the roller 75 to be properly adjusted with respect to the delivery table 11 and the ends of the chute bottoms 35.

To eliminate broken pieces, the bottoms 35 of the chutes are preferably provided with open slots 36 as indicated in Figs. 1 and 2. Unbroken wafers will be supported by the sides of these slots but smaller pieces will fall through the slots and be discharged down the chute 83 and to a discharge apron 85 which is herein shown as supported beneath the receiving table 11. To facilitate the discharge of these broken pieces from the apron 85, the same may be vibrated by means of the pitman 87 actuated by an eccentric 89 (Fig. 1) on the main shaft 31.

I shall next describe the preferred construction of the incline 9 as herein shown in detail. The various partitions 33 are formed of vertical sheets of metal secured together by transverse rods 91 and separated by spacing sleeves 93. Adjacent the upper end of these partitions is a rod 95 and the bottoms 35 may be secured in position by means of hooks 97 fastened to the under sides thereof and hooked over this rod 95, the bottoms preferably having a projecting portion as shown extending under the incline 7. The connection of the hook 97 with the rod 95 forms a detachable hinged joint and as the roller 75 rotates it will vibrate the bottom 35 of the chute, swinging the same about this joint and thus facilitating the gravitation of the wafers along downwardly to the receiving table. At the same time the bottom of the strip 69 and the weight connected thereto can be very readily removed for cleaning or repair or for gaining access to the mechanism beneath, since it is only necessary to unhook the hook 97 and withdraw the bottom.

Preferably the grooved receiving table 11 is detachably supported and I have herein (Fig. 2) shown the uprights 17 as provided with bracket arms 99. The arms 99 may be provided with studs 101 on the inner side and the table 11 may have brackets 103 provided with bayonet slots adapted to fit over these studs. The table is thus detachably supported between the bracket arms and the outer end (that to the right in Fig. 1) is unobstructed, so that workers may sit at either side thereof to remove the stacked wafers. The absence of any obstruction at that end of the table also provides ready access to the discharge apron 85 and facilitates cleaning beneath the machine.

Having described in considerable detail the particular embodiment of my invention chosen for purposes of illustration, I should remark that I have done so in order that the disclosed construction might be readily understood and not because all the details described are essential.

What I do claim and desire to secure by Letters Patent is:—

1. In a machine of the class described the combination of a chute and a receiver, a flexible member yieldably extended between the adjacent ends of said chute and receiver and means for alternately distending and relaxing said member.

2. In a machine of the class described the combination of a chute and a receiver, a flexible member yieldably extended between the adjacent ends of said chute and receiver and a roller beneath said member having a rise for recurrently distending the same.

3. In a machine of the class described the combination of a chute and a receiver, a flexible strip secured to said chute, means to draw the same yieldably past the end of said receiver and a roll beneath said strip having a rise recurrently to distend the same.

4. In a machine of the class described the combination of a chute and a receiver, a flexible weighted strip secured to said chute, and a roll beneath said strip to hold the same across the end of the receiver, said roll having a rise recurrently to draw up said strip and distend the same at the entrance to the receiver.

5. In a machine of the class described the combination of a chute and a receiver, a flexible strip secured to said chute, means to draw the same yieldably past the end of said receiver and means beneath the strip constructed and arranged recurrently to distend the same.

6. In a machine of the class described the combination of a chute and a receiver, a flexible weighted strip secured to said chute, and means beneath the strip constructed and arranged recurrently to draw up the same and distend it at the entrance to the receiver.

7. In a machine of the class described a receiver for articles stacked together, a flexible sheet across an end of the receiver, means to deliver articles one by one and edgewise inwardly of said sheet and a roller opposite the end of the receiver having a rise working against said sheet.

8. In a machine of the class described a receiver for articles stacked together, a flexible sheet across an end of the receiver, means to deliver articles one by one and edgewise inwardly of the sheet and means intermittently to distend said sheet along the receiver.

9. In a machine of the class described, in combination, a receiver, a chute delivering thereto comprising sides and a bottom pivoted adjacent the upper end of the chute, and a roller at the delivery end of the chute having a rise, said roller serving to support and vibrate the lower end of said bottom.

10. In a machine of the class described, in combination, a receiver, a chute delivering thereto comprising sides alining with the sides of the receiver and a bottom pivoted adjacent the upper end of the chute, a flexible member yieldably extended from said bottom past the end of the receiver and a roller beneath said member having a rise.

11. In a machine of the class described, in combination, a receiver, a chute delivering thereto comprising sides alining with the sides of the receiver and a bottom pivoted adjacent the upper end of the chute, and stacking means at the delivery end of the chute acting to vibrate said end.

12. In a machine of the class described, in combination, a receiver, a chute delivering thereto comprising sides alining with the sides of the receiver, a crossbar between said sides and a bottom having a hook detachably engaging the crossbar.

13. In a machine of the class described, in combination, a receiver, a chute delivering thereto comprising sides alining with the sides of the receiver, a crossbar between said sides adjacent to the upper end of the chute and a bottom having a hook detachably engaging said crossbar and a stacking means arranged to support and vibrate the lower end of the chute.

14. In a machine of the class described, in combination, a receiver, a chute delivering thereto comprising sides, a crossbar between said sides adjacent the upper end of the chute and a bottom having a hook detachably engaging said crossbar, a flexible member secured to the delivery end of said bottom, means for yieldably extending the same past the end of the receiver and a stacking means beneath said member.

15. In a machine of the class described a channeled receiving table, spaced plates alined with the sides of the channel, crossbars between pairs of the plates and bottom pieces arranged to set between plates and having hooks engaging said bars.

16. In a machine of the class described a channeled receiving table, spaced plates alined with the sides of the channel, crossbars between pairs of the plates, bottom pieces arranged to set between plates and having hooks engaging said bars, flexible strips attached to said bottom pieces and means to draw them yieldably across the ends of the grooves.

17. In a machine of the class described a channeled receiving table, spaced plates alined with the sides of the channel, crossbars between pairs of the plates, bottom pieces arranged to set between plates and having hooks engaging said bars, flexible strips attached to said bottom pieces, means to draw them yieldably across the ends of the grooves, and stacking mechanism working beneath said strips.

18. In a machine of the class described a frame including pairs of legs connected by side bars, assorting mechanism supported from said bars, a bracket arm projecting from a leg of each pair, studs on the arms and a receiving tray between the arms having slots receiving said studs, the space beneath said arms being substantially unobstructed.

19. An assorting chute for machines as described comprising parallel vertical plates, rods extending transversely through the plates, spacing sleeves on certain rods and a removable bottom fitting between a pair of plates having a hook engaging a rod.

20. A machine of the class described comprising a series of inclines over which pieces gravitate and are assorted, a drive shaft beneath said inclines, a groove cam on the shaft and a pair of followers secured to two such inclines, both coöperating with the groove of the cam.

21. A machine of the class described comprising an inclined hopper, a swivel mounting therefor, an incline receiving material from the hopper and mounted for transverse sliding movement, a drive shaft beneath the parts mentioned having a groove cam and followers secured to the hopper and the incline coöperating with said cam.

In testimony whereof, I have signed my name to this specification.

LESTER O. THOMAS.